June 23, 1970      N. L. CROOK      3,516,624

PITCH STABILIZATION SYSTEM FOR DUAL UNIT AIRCRAFT

Filed Aug. 12, 1968      2 Sheets-Sheet 1

*INVENTOR.*
NORMAN L. CROOK

BY *Knox & Knox*

United States Patent Office 3,516,624
Patented June 23, 1970

3,516,624
PITCH STABILIZATION SYSTEM FOR DUAL UNIT AIRCRAFT
Norman L. Crook, 2840 Brosman,
San Diego, Calif. 92111
Filed Aug. 12, 1968, Ser. No. 751,974
Int. Cl. B64c 3/38, 37/02
U.S. Cl. 244—2       7 Claims

ABSTRACT OF THE DISCLOSURE

The system provides pitch control stabilization of a dual unit aircraft of the type disclosed in U.S. Pat. No. 3,258,228, which comprises a flight sustaining unit with a payload unit pivotally suspended therefrom. Primary flight control means is incorporated in the flight unit, and the payload unit has trim controls for attitude adjustment. The pitch stabilization system senses pitch deviations between the two units, due to turbulent air, power failure, or any other causes, and actuates the flight and trim controls to return the two units to stable flight.

BACKGROUND OF THE INVENTION

The present invention relates to aircraft and specifically to a pitch stabilization system for a dual unit aircraft. At low speeds most aircraft have marginal control response, particularly in the event of a power failure. This is especially true in the case of short take-off and landing (STOL) aircraft, which are greatly dependent on their vertical thrust or lift capabilities. In the take-off, with the aircraft in a climbing attitude, power failure can be disastrous, since the speed is low and the aircraft is usually in its maximum drag configuration. Considerable inertia and control force is necessary for recovery and altitude may be insufficient.

Also, in turbulent conditions the entire aircraft is subject to disturbed motion, pitch motion being most objectionable, and constant control action is necessary to overcome the effects.

SUMMARY OF THE INVENTION

The dual unit aircraft disclosed in the U.S. Pat. No. 3,258,228 offers a solution to most of the above mentioned problems encountered in critical phases of flight, and is further improved by the pitch stabilization system described herein.

The flight unit of the aircraft is of light construction and has a low inertia, the flight control forces being low and response rapid. The payload unit is suspended from the flight unit in the manner of a pendulum and is aerodynamically trimmable to a desirable attitude, to some extent independently of the attitude of the flight unit. Any deviation in pitch attitude between the two units results in a longitudinal shift of the center of mass of the payload unit relative to the center of lift of the flight unit, which results in a shift of the effective center of gravity of the composite aircraft.

The aircraft is easily handled by the basic controls, but the pitch stabilization system relieves the pilot of constant control operation in conditions other than normal smooth flight. This is particularly advantageous in the event of power failure at take-off, when loss of inertia causes the payload unit to tend to return by pendulum action to a level flight attitude. The stabilization system has sensing means to sense the resultant deviation in pitch attitudes of the two units and apply powerful control action to bring the flight unit rapidly to level flight position, from which a recovery can be made.

BRIEF DESCRIPTION OF THE DRAWINGS

Similar characters of reference indicate similar elements and portions throughout the specification and throughout the views of the drawings.

DESCRIPTION OF THE PREFERRED EMBODIMENTS

Figure 1:
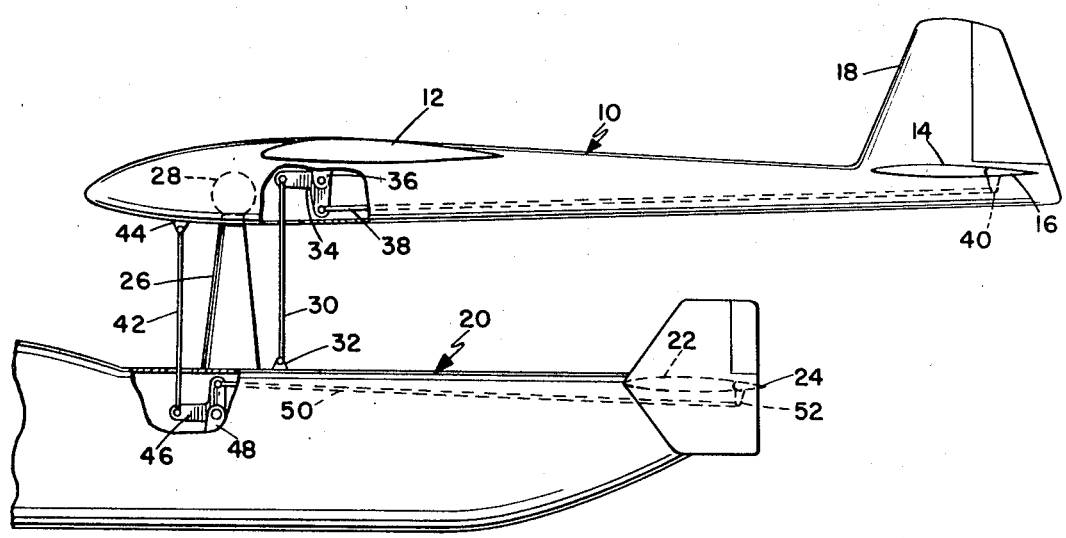
FIG. 1 is a side elevation view of a dual unit aircraft with the basic pitch stabilization system shown diagrammatically.
Figure 2:
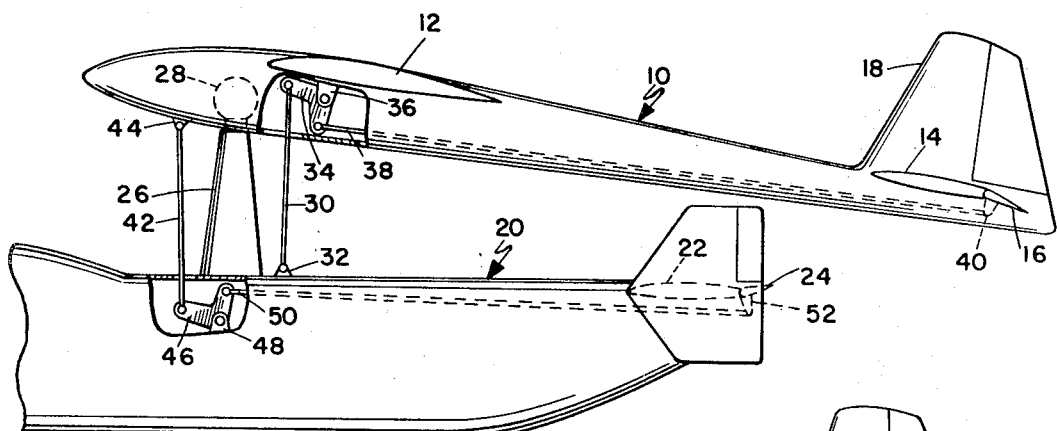
FIG. 2 is similar to FIG. 1 and shows the pitching up action of the flight unit and the resultant control action.
Figure 3:
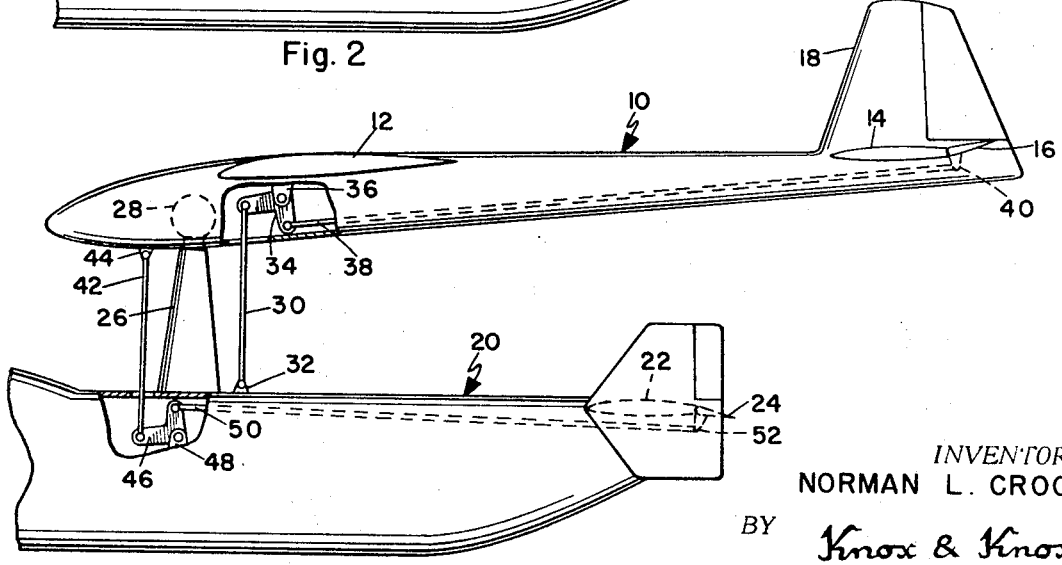
FIG. 3 shows the pitching down action of the flight unit.

The mechanism shown in FIGS. 1-3 is the basic simplified form of the system, but indicates the action clearly.

The aircraft comprises a flight unit 10, with a wing 12, a tailplane 14, elevator or pitch control surface 16 and a fin or vertical stabilizer assembly 18. Beneath the flight unit is a payload unit 20 having a rear horizontal stabilizer or tailplane 22 with one or more pitch trim surfaces 24, the payload unit being of any suitable configuration. At approximately the center of gravity position, the payload unit has an upwardly extending pylon 26, at the top of which is a pivotal connection, shown as a ball joint 28, by which the payload unit is suspended from the flight unit. The aircraft and its operation are fully described in the above mentioned U.S. patent. Generally, the flight unit is used for basic control and the forces involved are small, since the structure can be very light compared to a conventional aircraft with a large fuselage. The payload unit is suspended in the manner of a pendulum and is aerodynamically trimmed to the desired attitude. Thus the payload unit can maintain a stable flight attitude and is not required to follow all the motions of the flight unit.

The stabilization system includes a link rod 30, rearwardly of pylon 26, connected between a fixed lug 32 on the payload unit 20 and a bellcrank 34 pivotally mounted on a bracket 36 in the flight unit 10. From bellcrank 34 an actuating rod 38 extends to the control horn 40 of pitch control surface 16, so that motion of the bellcrank causes corresponding motion of the control surfaces. Forward of pylon 26 is a link rod 42 connected from a fixed lug 44 on flight unit 10 to a bellcrank 46 pivotally mounted on a bracket 48 in payload unit 20. From bellcrank 46 an actuating rod 50 is connected to the control horn 52 of pitch trim surface 24. The control ratios of the linkages will depend on the sizes of the control surfaces and the performance requirements of the aircraft.

In flight, if the flight unit has a nose up pitching motion relative to the payload unit, as in FIG. 2, the decreased distance between the two units aft of pylon 26 will cause link rod 30 to rotate the bellcrank 34 and pull actuating rod 38 to swing pitch control surface 16 downwardly. This applies a powerful aerodynamic force to counteract the nose up pitching. At the same time the distance between the two units is increased forward of the pylon and the link rod 42 causes bellcrank 46 to rotate and push on actuating rod 50, to swing pitch trim surface 24 upwardly and apply a tail down trim action to the payload unit.

The resultant control action prevents physical contact of the two aircraft units and returns the units to a stable flight condition. Payload unit 20 is affected less than the flight unit since it is subject to a trim action only, the flight unit being subject to the major control reaction.

A nose down pitching action of the flight unit as in FIG. 3, produces the opposite control reaction. Link rod 30 will pull down on bellcrank 34, causing actuating rod 38 to push pitch control surface 16 upwardly. Link rod 42 will simultaneously push down on bellcrank 46 and cause actuating rod 50 to pull the pitch trim surface 24 down. Again the result is to return the two units to the proper stable attitude relative to each other.

Figure 4:
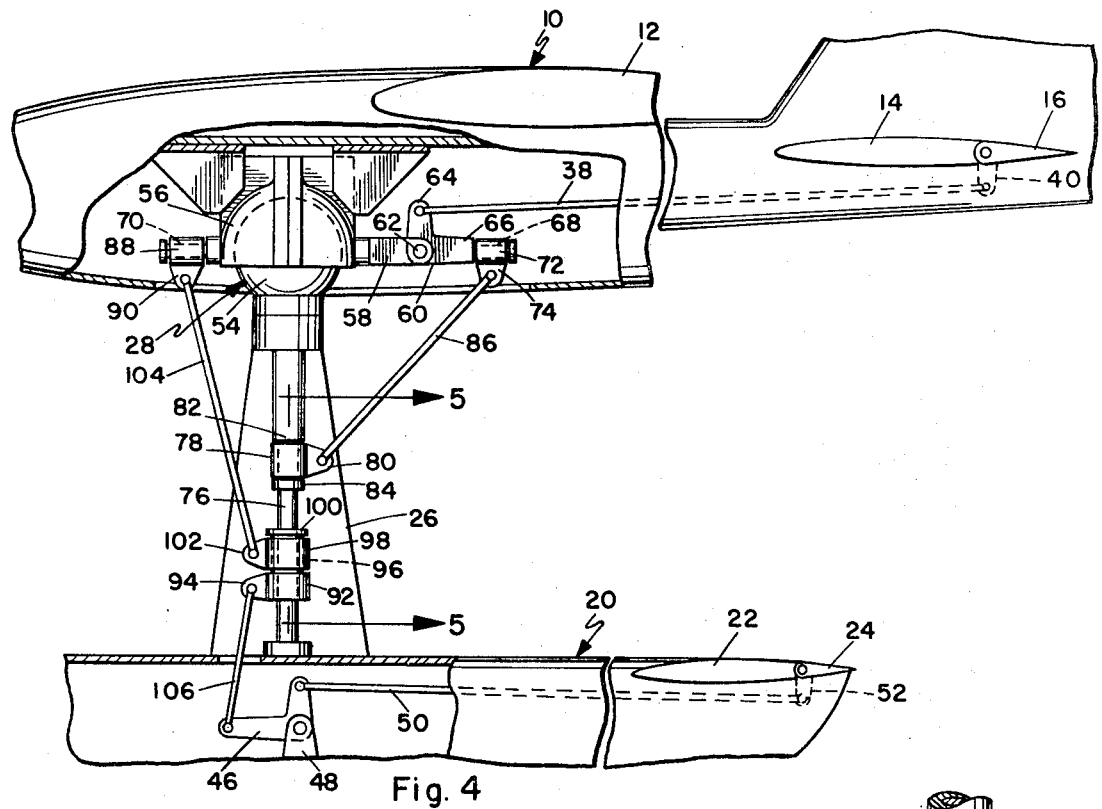
FIG. 4 is a practical adaptation of the stabilization system to accommodate roll and yaw deviations of the aircraft without affecting pitch control.
Figure 5:
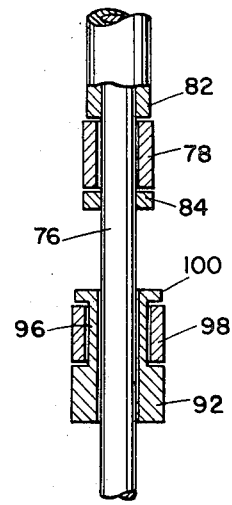
FIG. 5 is an enlarged sectional view taken on line 5—5 of FIG. 4.

The mechanism thus far described is restricted to pitch control. In the basic aircraft the two units are universally interconnected for roll and yaw deviations as well as pitch, so that the payload unit has the desired pendulum stability. An adaptation of the mechanism to accommodate roll and yaw motions, without interfering with pitch stabilization, is shown in FIG. 4.

In this configuration the linkage is unchanged in the payload unit and the actuating rod connection to the pitch control surface in the flight unit is as already described. Pylon 26 may be of any suitable structure, with or without an aerodynamic fairing, and the ball joint 28 includes a ball element 54 fixed on to pof the pylon. Flight unit 10 is held by a socket element 56 suitably secured to adjacent structure and fitting over the ball element for universal pivotal motion thereon. Fixed to the socket element 56, on the longitudinal axis of the flight unit through the center of ball element 54, is a rearwardly extending fork 58, in which is mounted a bellcrank 60 pivoted on a transverse pin 62. Bellcrank 60 has an upwardly extending arm 64, to which actuating rod 38 is pivotally connected, and a rearwardly extending arm 66 at the rear end of which is a short shaft portion 68. On the front of socket element 56, diametrically opposed to fork 58, is a forwardly projecting stub shaft 70 which is coincident with the roll axis of the flight unit. In the neutral position of the bellcrank, as shown in FIG. 4, the axis of shaft portion 68 is also on the flight unit roll axis. Deflection of the bellcrank due to pitch deviation will offset the shaft portion 68 from the roll axis, but the cross coupling of pitch and roll control thus caused is negligible in normal flight and is, in any event, compensated for by the stabilization system.

Rotatably mounted on shaft portion 68 is a collar 72 having a lug 74. Extending vertically downwardly from and coaxial with ball element 54 is a guide post 76 which is fixed relative to the payload unit and coincident with the yaw axis of the flight unit. Rotatably mounted on guide post 76 some distance below the ball element is a collar 78 having a lug 80, the collar being held axially in place between a shoulder portion 82 on the guide post and a fixed stop 84. A link rod 86 is pivotally connected between lugs 74 and 80 and is the equivalent of link rod 30 in the simplified mechanism. Lug 80 is the equivalent of lug 32, which can be at any convenient location on the fixed structure of the payload unit, but collar 78 allows for yaw deviation of the flight unit, and collar 72 allows for roll deviation without interfering with the geometry of the pitch control linkage.

Rotatably mounted on stub shaft 70 is a collar with a lug 90 which, since the stub shaft is fixed relative to the flight unit, is the equivalent of lug 44. Axially slidably mounted on the lower portion of guide post 76 is a collar 92 with a lug 94, said collar having an integral upwardly extending sleeve 96 on which is rotatably mounted a second collar 98, held axially in place by a flange 100. Collar 98 has a lug 102 from which a link rod 104 is connected to lug 90. A second link rod 106 is connected from lug 94 to the bellcrank 46, to complete the linkage. Rotation of collar 98 allows for yaw action while the sliding of the dual collar assembly transfers the motion causing the pitch trim action from the flight unit to bellcrank 46, as accomplished by the link rod 42 in the simplified mechanism.

Figure 6:
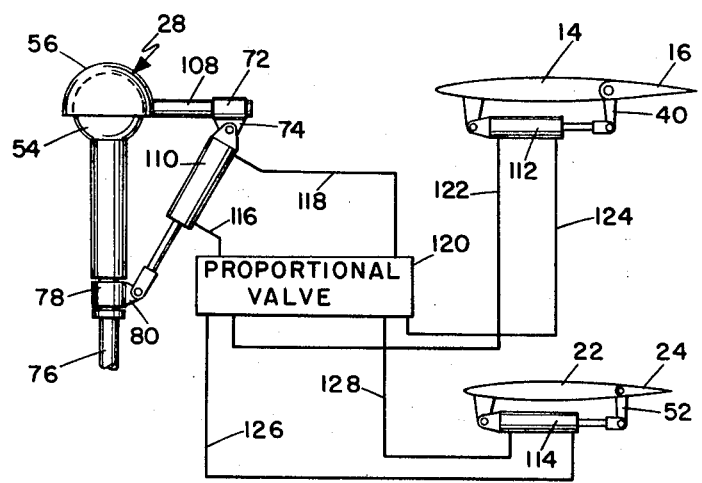
FIG. 6 is a diagram of a fluid actuated form of the stabilization system.

In aircraft having fluid pressure service the system shown in FIG. 6 may be used. The arrangement of the ball joint 28, guide post 76 and the collar 78 on the guide post are retained, but the bellcranks and mechanical linkage are replaced by fluid actuated components. Collar 72 is rotatably mounted on a shaft 108 extending rearwardly from socket element 56 on the roll axis of the ball joint, and a double acting linear actuator 110 is connected between the lugs 74 and 80. The actuator 110 comprises the link between the flight and payload units to sense pitch deviations and provide corresponding actuating responses.

A double acting linear pitch actuator 112 is connected between horn 40 and adjacent fixed structure for operation of pitch control surface 16, and a similar pitch trim actuator 114 is connected between horn 52 and adjacent structure for operation of pitch trim surface 24. Pressure lines 116 and 118 lead from opposite ends of actuator 110 to a proportional valve 120, from which control lines 122 and 124 extend to actuator 112 and control lines 126 and 128 extend to actuator 114. The valve 120 can be of any suitable type and merely provide reduced control to the pitch trim actuator 114, since the trim motion is substantially less than the primary pitch control motion. This eliminates the necessity for a separate actuator forward of the ball joint. While a simple closed fluid system is shown, it will be obvious that existing aircraft services can be adapted, with pump and pressure reservoir means and appropriate valves.

In addition to providing longitudinal stability in various flight phases, the system is particularly effective in the event of power failure during take-off. In this critical phase, the aircraft is usually at a steep angle of climb and speed is low. A sudden loss of power and forward inertia will cause the payload unit to swing rearwardly by pendulum action, approaching a level flight condition. This results in a relative nose up pitch of the flight unit, corresponding to the position shown in FIG. 2, and the stabilization system immediately applies a nose down pitch control action to the flight unit. Since the controls do not have to overcome all the inertia of a heavily loaded aircraft, merely the light weight flight unit, the response is rapid and recovery to level flight occurs before a stall.

The stabilization system is intended to assist the pilot, rather than act as a primary control system. For complete control it is a simple matter to couple the conventional aircraft controls to the stabilization system, so that the pilot can maintain normal control in addition to the stabilizing action. In the fluid system, it is a simple matter of valving, while in the mechanical system the conventional controls can be coupled into actuating rods 38 and 50 by differential or similar linkages. Such mechanisms are well known in the simple types of automatic pilot systems and in other multiple input controls.

While the system is shown for pitch stabilization, which is the most critical in flight control, it will be evident that it is equally adaptable to roll or yaw stabilization if such control is necessary.

It is understood that minor variation from the form of the invention disclosed herein may be made without departure from the spirit and scope of the invention, and that the specification and drawings are to be considered as merely illustrative rather than limiting.

What is claimed is:

1. In an aircraft comprising a flight unit having a wing and a movable pitch control surface, a payload unit, pendulously suspended from and aerodynamically supported by the flight unit and being pivotal about at least the pitch axis of the aircraft, said payload unit having a movable pitch trim surface thereon, the improvement of a pitch stabilization system, comprising:

link means connected between said flight and payload units to sense relative pitch deviations therebetween; and actuating means connected from said link means to said pitch control and pitch trim surfaces to move the surfaces in effective opposition to the sensed pitch deviations.

2. The structure of claim 1, wherein said actuating means includes pitch control actuating means in said flight unit and pitch trim control actuating means in said payload unit, said link means including a link rod connected between said pitch control actuating means and fixed structure on said payload unit, and a link rod connected between said pitch trim actuating means and fixed structure on said flight unit.

3. The structure of claim 2, wherein the connection of said first mentioned link rod to said pitch control actuating means is pivotal substantially on the roll axis of said flight unit and the connection to fixed structure on the payload unit is pivotal about the yaw axis of the flight unit, the connection of said last mentioned link rod to the fixed structure of the flight unit being pivotal about the roll axis of the flight unit and said last mentioned link rod having an intermediate connection pivotal about the yaw axis of the flight unit.

4. The structure of claim 1, wherein said link means includes a link rod having a connection to said pitch control actuating means which is pivotal substantially on the roll axis of the flight unit, and a connection to a fixed portion of said payload unit which is pivotal about the yaw axis of the flight unit.

5. The structure of claim 1, and including a guide post fixed relative to said payload unit and coincident with the yaw axis of the flight unit;

a collar axially retained in said guide post and rotatable about the yaw axis thereon;

said link means including a link element connected from said collar to a connection on said flight unit pivotal about the roll axis of the flight unit.

6. The structure of claim 5, wherein said link means further includes a link element having a connection at one end to said flight unit pivotal about the roll axis of the flight unit, the other end thereof being connected to said pitch trim actuating means; and said last mentioned link element having an intermediate coupling axially slidable and rotatable on said guide post.

7. The structure of claim 1, wherein said link means includes a double acting linear actuator coupled between said flight and payload units;

said actuating means including double acting linear actuators connected to said pitch control and said pitch trim surfaces, and coupled to said first mentioned actuator to operate in response to motions of the first mentioned actuator.

References Cited
UNITED STATES PATENTS

| | | |
|---|---|---|
| 2,009,296 | 7/1935 | Mayo. |
| 2,062,599 | 12/1936 | North. |
| 2,883,125 | 4/1959 | Jarvis et al. |
| 2,921,756 | 1/1960 | Borden et al. |
| 3,258,228 | 6/1966 | Crook. |

TRYGVE M. BLIX, Primary Examiner

J. L. FORMAN, Assistant Examiner

U.S. Cl. X.R.

244—3, 45